3,022,184
STARCH MODIFICATION WITH POLYBORATES
Ralph W. Kerr, Riverside, Ill., assignor to Corn Products Company, New York, N.Y., a corporation of Delaware
Filed Aug. 25, 1959, Ser. No. 835,917
4 Claims. (Cl. 106—210)

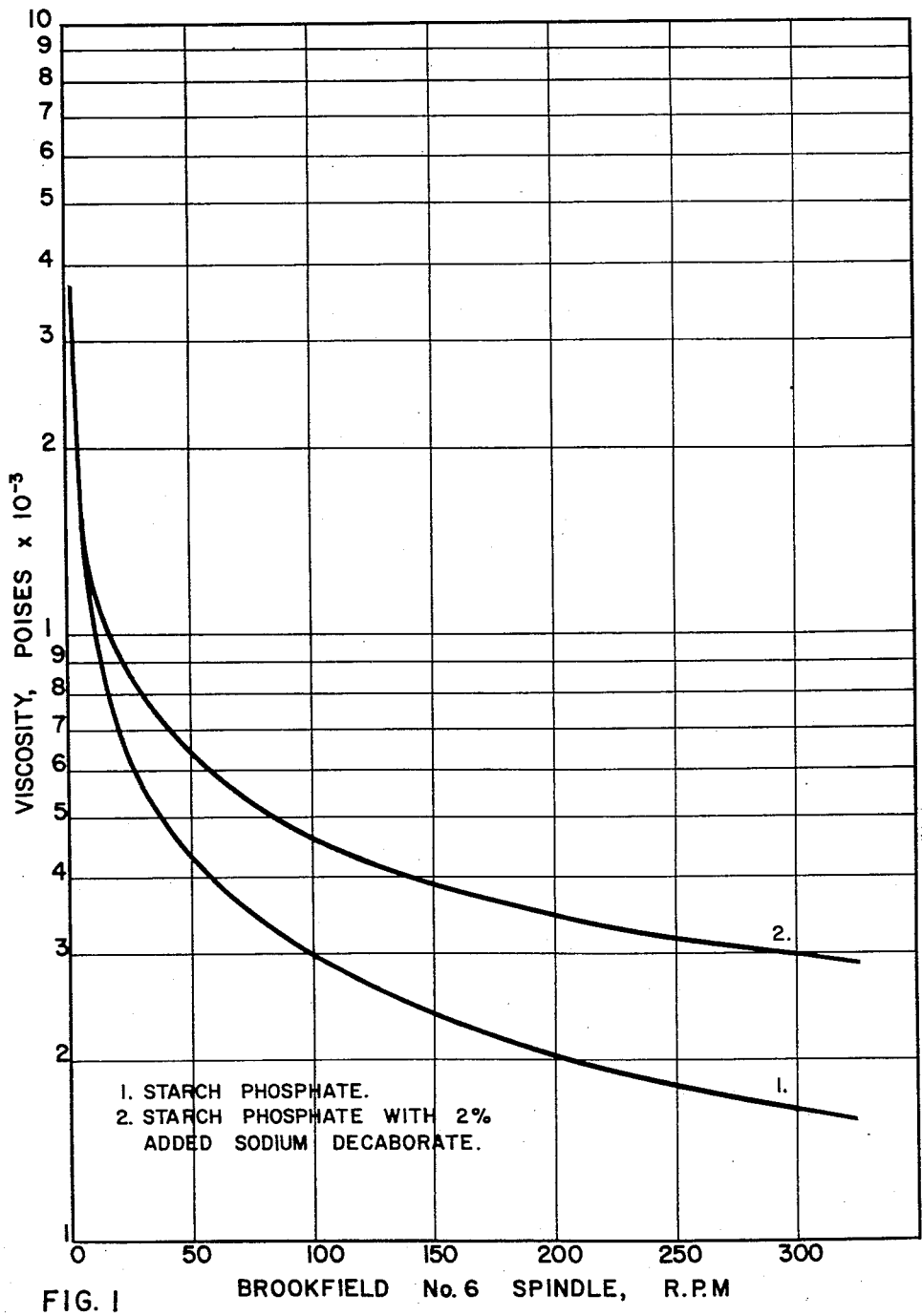
FIG. I CHANGE IN PASTE VISCOSITY WITH RATE OF SHEAR
INVENTOR
RALPH W. KERR

This invention relates to a new method of modifying various properties of amylaceous materials with salts of polyboric acid.

The object of this invention is to provide a novel method for modifying the paste, sol or gel properties of starch, dextrins and other amylaceous polysaccharides by the addition to aqueous dispersions of these products, a water soluble salt of a polyboric acid. A further object is to provide novel compositions of matter in which starch or starch product is the major component and a polyborate is a minor component.

Starch and starch products are used industrially as a hydrosol or hydrogel in several important applications, such as the sizing of textile and paper products, as a thickening agent for aqueous systems and as an adhesive, the latter, primarily in the manufacture of paper products into finished articles, such as bags, envelopes, boxes, cartons, labels and tape. In practically all cases it is desirable in preparing the size, thickening agent or adhesive to add one or more so-called "plasticizing" agents in order to modify the physical properties of these compositions, so as to impart new properties or to enhance inherent ones. The list of properties so modified is very large. However, the more important ones are: to increase or to decrease the viscosity of the system, to improve the flow properties of the fluid (that is, decrease "shortness") to repress or inhibit anomalous viscosity effects due primarily to gelation, to improve the "tack" of adhesives, to increase the apparent drying rate of adhesives (decrease time for adhesive film to set with a non-tacky surface) to improve the flexibility and strength of starch films, particularly when applied as sizes to textile and paper products, to increase the hand, or body of fabrics finished with starch, to improve and maintain a higher degree of clarity in starch pastes and sols and many other effects which either improve the working characteristics of the prepared starch product on the high speed and automatic machinery used in the hereinabove mentioned applications or improve the quality and salability of the manufactured articles insofar as they depend upon starch.

It should be noted that many industrial starches, such as corn, grain sorghum, potato and tapioca starches are physical mixtures of two structurally different polysaccharides, one a linear polymer of glucose units and the other, a branched polymer. It is believed that the linear polymer, called amylose, is primarily responsible for many of the undesirable characteristics of starch products in the several applications above outlined. This is due to the colloidal instability of dispersions of linear polymers.

Plasticizers of the type with which this invention is concerned act, in general, to do the following:

(1) Increase the viscosity or body of a paste of starch products, such as an unmodified corn starch or of a pyrodextrin so that if it is used in a given application as an adhesive, for example, it appears to "carry more water" and therefore be more economical to use.

(2) Alter the flow properties of sols, so that if a "long" or stringy sol of the starch product is applied to paper or fabric by means of rollers, or wheels rotating at high speed, the paste will be sufficiently "shortened" so that it will not be prematurely thrown from these applying devices before the applying device is in a position to transfer the starch to the paper or textile.

(3) Increase the tack of adhesives prepared from starch or starch products.

(4) Increase the apparent "drying" rate of adhesives and films prepared from starch products.

(5) Decrease the tendency of starch products to form irreversible gels when aged, particularly at lower temperatures.

(6) Increase the flexibility of films of starch products when applied, for example, as sizes to textile and paper products.

Heretofore, the most common additive used to secure these and other desirable plasticizing effects with starch products has been borax. Other compounds such as sodium stannate, trisodium phosphate have also been used. Borax has been used primarily because of its availability, comparatively low price and its effectiveness. This has been particularly true in the application of pyrodextrins, made from starch, in the field of adhesives. It has been proposed that the borax, or borate radical, forms a complex with the linear polymer (or amylose) constituent of the starch product, and that this action modifies the undesirable characteristics of this starch constituent. It has been proposed that the borax, or borate radical forms a relatively labile cross-linkage between two linear polymer polysaccharide chains and thereby tends to inhibit these linear molecules from orienting close enough to each other so as to form hydrogen-bonded cross-linkages, which are relatively much more stable, and which supposedly account for the undesirable colloidal properties of hydrosols or hydrogels which contain linear starch molecules.

More specifically, it has further been proposed, for example, in a paper by Isbell et al., J. Research, National Bur. Standard, 40, 129 (1948), from a study of the action of borax on the monomer glucose, that the complex diglucose borate that is formed is in equilibrium in aqueous medium with borax and glucose and that the percentage of complex present is concentration dependent, that is, the greater the amount of borax added for example, the greater the percentage of complex formed, and the higher the diluent of the system, the more the complex dissociates into glucose and borate ion. It is believed that the continual formation and dissociation of a starch-borate complex, containing these diglucose borate groups, accounts for many of the rather unique effects resulting when borax is used as a plasticizer for starch products.

From the above discussion, several of the disadvantages to the use of borax with starch products are apparent.

First, relatively large proportions of borax must be incorporated into starch product formulations to produce the above described effects to a significant degree.

Secondly, since borax, whether in low or even at relatively high concentrations, is definitely quite alkaline, starch hydrosols containing 5 to 15 percent borax, based on starch, develop pH values of the order of pH 9 to pH 10. This seriously limits the use of borax with starch products in many industrial applications, particularly in sizing textiles and paper. Even in the field of adhesives, borax may only be used in certain applications where highly alkaline adhesive may be tolerated. Even here, where borax or other highly alkaline plasticizer such as sodium phosphate is used, there is a tendency for the cooked adhesive or size to become discolored to an undesirable degree.

In using borax, the "plasticizing" effects of any specific addition to starch product formulations are very variable, changing as the paste is diluted, or concentrated as in drying to form an adhesive bond, or again, as the temperature is raised or lowered. This variable effect can be explained on the basis that complex formation between starch molecule chains and the borate radical, is highly unstable, as above set forth.

I have now discovered that nearly all of the desirable effects obtained by the use of borax, or sodium phosphate, with starch products may be obtained and very nearly all of the undesirable effects substantially eliminated by the use of polyborates, that is, salts of polymers of boric acid. These compounds may also be viewed as linear chains of polymerized borax.

For the purpose of discussion, illustrations will be made with reference to the commercially available, and relatively low cost, sodium decaborate.

I have found that when sodium decaborate, $$Na_2B_{10}O_{16} \cdot 10H_2O$$

is added to starch product formulations, such as dextrin adhesives, or thin-boiling starch sizes, and even in amounts commonly used when borax is employed, alkalinity does not develop as it does with borax. Indeed, pure aqueous solutions of the sodium decaborate give pH values of only 7.1 at a concentration of 10 percent and only pH 6.8 at a concentration as high as 15 percent. The virtual neutrality of the higher sodium polyborates, eliminates one of the most serious disadvantages to the use of borax with starch products. I have found, furthermore, that when sodium decaborate is added to starch product formulations on a dry basis molecular weight equivalent to borax, the desirable plasticizing effects noted for borax additions are obtained more readily. The reasons for these results are made more clear by reference to the figure below, which illustrates diagrammatically a proposed theory for the nature of the decaborate and its action. However, the structural formula of the decaborate is not known with certainty.

starch. The paste may then be said to "carry more water" for a given application viscosity, and accordingly, the yield of adhesive per unit weight of starch product is increased.

(2) The stringiness of certain adhesive and size formulations, which are too "long" to be applied economically by modern high speed machinery is satisfactorily reduced to the desired level by the addition of relatively small percentages, based on starch product, of a polyborate.

(3) The apparent drying or setting time of prepared starch adhesives or sizes, such as cotton warp sizes, is materially reduced by adding a polyborate.

(4) The tendency of adhesives and sizes prepared from starch products to congeal into irreversible aqueous gels is materially reduced by the addition of a polyborate.

(5) The "tack" of an adhesive prepared from a starch or starch product is increased by adding a polyborate.

These, and other related effects may be secured by adding a polyborate to the starch, or starch product, prior to, during or after gelatinization, depending upon convenience, and to some extent on the colloidal effect to be accentuated, or altered. For example, to increase the adhesive tack of a dextrin, it is preferred to add the polyborate prior to gelatinization and to cook the dextrin with the polyborate. On the other hand, to increase the "body" of a prepared starch adhesive, or the paste yield value, excellent results may be obtained simply by adding the polyborate to the gelatinized starch.

This invention is applicable to all varieties of starch such as, for example, corn, tapioca and grain sorghum starches and also to modified starch products such as thin-boiling grades made by acid modification or oxidation,

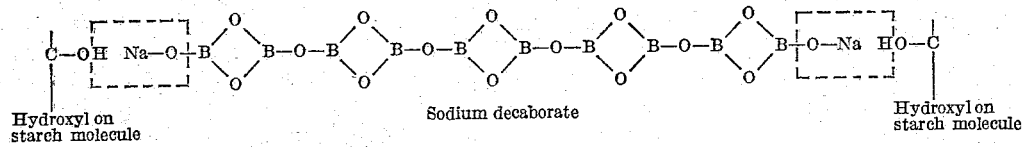

Hydroxyl on starch molecule      Sodium decaborate      Hydroxyl on starch molecule First of all, it will be noted that in the decaborate there is a ratio of only two alkali sodium ions for every ten boric acid groups (or one sodium for every five boric acid units), and accordingly, alkalinities in aqueous solution of this polymer are not nearly as high as is an aqueous system containing borax, where there is one alkali sodium for only two boric acid units.

Secondly, the polyborate molecule is, relatively, of considerable length. Accordingly, it can more readily establish cross-linkages between starch molecules which are relatively at considerably greater average distances from each other in a starch sol, or even in a starch gel, than they are, for example, in a starch granule. Cross-linking of starch with many common bifunctional reagents is normally carried out in conventional processes used by the starch industry on starch granules, employing highly potent cross-linking agents such as for example, phosphorus oxychloride.

However, whether or not the currently proposed theory for the nature of the polyborates is substantially correct, I have found by experiment that the addition of polyborates to aqueous pastes of starch and starch products, such as for example, the so-called thin-boiling starches and dextrins of commerce, advantageously alters the use properties of these products, as will hereinafter be set forth more explicity, without certain disadvantageous features which attend the use of additives such as borax, sodium stannate, sodium phosphate and the like.

More specifically, the addition of polyborates to aqueous dispersions of starch and starch products leads to the following useful effects:

(1) Increases the paste viscosity, as for example, in preparing low cost adhesives from otherwise unmodified as well as derivatives such as esters and ethers, for example, water dispersible starch acetates and hydroxyalkyl ethers. However, inasmuch as the several varieties of starch and modifications of these starches, show inherent differences in such properties as paste body, shortness or stringiness and gelation, the magnitude of the effect produced by adding a polyborate may vary with the starch or starch product employed. Thus, for example, a relatively small addition of sodium decaborate to corn starch will cause a significant increase in paste body, while reducing the tendency of the paste to set to a characteristic corn starch gel. On the other hand, the addition of the same percentage of the decaborate to a "waxy" corn starch, waxy maize, may result in a less proportionate increase in paste body and have less effect on gelation of the waxy maize starch paste. These results are understandable, especially in view of the theory hereinabove set forth, inasmuch as corn starch contains about 30 percent of the linear polymer amylose whereas waxy maize starch is substantially 100 percent branched polymer, or amylopectin. As another example to illustrate differences in polyborate effect, the starch phosphates may be cited, either the naturally occurring starch phosphate esters such as potato starch, or those made synthetically from, let us say, corn starch. Addition of a polyborate to a paste of corn starch phosphate, D.S. about 0.03, has a more pronounced effect in increasing paste body and the viscous nature of the paste than does an equal addition of the polyborate to a paste of underivatized corn starch.

Effects of polyborates on the colloidal properties of starch or starch products have been found over a relatively wide range of concentration; effects have been observed adding as little as 0.5 percent by weight, based on starch, dry basis to as high as 20 percent.

Suitable polyborates, are in general, the water soluble salts such as the sodium and potassium salts. Preferred salts are sodium octaborate and sodium decaborate, primarily because of their relatively low cost and their availability for commercial or industrial scale operations.

The following examples will additionally illustrate the invention, although they are not intended to be limiting.

EXAMPLE 1

This example shows primarily the increase in paste body obtained, at several paste temperatures, by adding sodium decaborate to corn starch.

Twenty-five grams of corn starch was suspended in water into which 2 grams of sodium decaborate, anhydrous basis (actually 2.88 grams of $Na_2B_{10}O_{16} \cdot 10H_2O$), had been dissolved. The slurry was made up to a volume of 500 ml. and showed a pH of 8.2. The slurry was then heated with stirring in the pasting cup of a Brabender amylograph wherein the viscosity, or body of the paste is graphically recorded continuously during a fixed cooking and cooling cycle. The temperature time intervals were: 30 minutes to reach 95° C.; the paste was cooked by holding at 95° C. for 60 minutes; the paste was cooled, with stirring to 50° C. over a period of 30 minutes and finally, the paste was stirred at 50° C. for an additional 60 minutes. Accordingly, the total time over which viscosity was recorded was 180 minutes. The paste reached its peak pasting viscosity in about 18 minutes.

Inasmuch as for different sizing and adhesive applications, preparation of the starch paste will be stopped at various stages, corresponding to various time intervals in the Brabender cycle, the viscosity or body of the cooked starch in this example is given for several significant Brabender times, in Brabender viscosity units. Thus for example, in the preparation of thick bodied adhesives such as are used in sealing the bottom seams of paper bags, gelatinization of the starch may be stopped at a cooking stage corresponding to the peak pasting viscosity shown at about 18 minutes in the Brabender cycle, whereas, at the other extreme, such as the preparation of certain sizes, gelatinization will correspond to the final paste obtained in the Brabender amylograph at 180 minutes.

For comparison, the Brabender viscosities are given for corn starch in a duplicate test with no added decaborate, but with the pH value adjusted with dilute sodium hydroxide to 8.2.

| Make-up Starch and Additive | Brabender Viscosity [e] at Total Elapsed Minutes in the Brabender Amylograph | | | | |
|---|---|---|---|---|---|
| | 18 min.[a] | 30 min.[b] | 90 min.[c] | 120 min.[d] | 180 min. |
| Conr Starch + Decaborate | 320 | 195 | 140 | 510 | 495 |
| Corn Starch (alone) | 120 | 105 | 80 | 170 | 180 |
| Corn Starch + Borax | 410 | 180 | 80 | 420 | 335 |

[a] Peak pasting viscosity reached.
[b] Maximum cooking temperature of 95° C. reached.
[c] End of cooking period at 95° C.
[d] End of cooling period to 50° C.
[e] To convert Brabender viscosity to poises, multiply data by 0.0175; thus, 320 Brabender viscosity=320×0.0175=5.60 poises.

The above data show that at each stage of the cooking and cooling cycle, the body of the starch paste was very significantly increased by the addition of the decaborate. This increase was such that the final paste (at 180 minutes) could be diluted with almost 30 percent more water and still retain a paste body equal to the paste prepared without adding the decaborate.

For further comparison, Brabender viscosity data are given for corn starch paste (25 grams in 500 ml.) in which instead of added decaborate, an equal molecular percentage of borax was added. It will be seen that in general, the effect of the decaborate was greater. Moreover the alkalinity of the corn starch borax paste (being pH 9.0) was nearly ten times greater than that of the corn starch decaborate paste.

The pastes were allowed to stand at room temperature overnight. Whereas the paste with no decaborate had set to a characteristic, corn starch gel, which remained chunky and nonhomogeneous on stirring, the aged paste containing the decaborate, although congealed to a heavy bodied mass, was readily stirred into a smooth, free flowing viscous paste.

EXAMPLE 2

This example shows the effect of sodium decaborate on the paste of a waxy starch, commercially known as white milo.

Procedures were the same as given in Example 1 except that 20 grams of white milo starch was used instead of 25 grams of corn starch. The pH value of the make-up was 8.1.

Brabender viscosities recorded during the cooking and cooling cycle are given in the table below.

| Make-up Starch and Additive | Brabender Viscosity at Total Elapsed Minutes in the Brabender Amylograph | | | | |
|---|---|---|---|---|---|
| | 18 min. | 30 min. | 90 min. | 120 min. | 180 min. |
| White Milo Starch + Decaborate | 320 | 160 | 60 | 100 | 175 |
| White Milo Starch (alone) | 280 | 110 | 25 | 55 | 45 |

In this instance the added decaborate increased the Brabender viscosity only about 15 percent at the pasting peak (18 minutes) and only about doubled the viscosity of the paste when cooled to 50° C., effects which are proportionately less than shown for corn starch in Example 1. At other stages in the Brabender cycle the proportionate increases are greater.

EXAMPLE 3

The procedure given in Example 1 were repeated with the exception that 2 grams, anhydrous basis, of sodium octaborate ($Na_2B_8O_{13} \cdot 4H_2O$ sold under the trade name, Polybor) was used in place of the 2 grams, anhydrous basis, of sodium decaborate. Substantially identical results were obtained with the octaborate in increasing the paste body of corn starch as were obtained in Example 1 by adding the decaborate.

EXAMPLE 4

The procedures given in Example 1 and 2 were repeated with the exception that 2 grams, anhydrous basis, of sodium pentaborate was used in place of the 2 grams of sodium decaborate.

The effects obtained on corn starch pastes were quite comparable to the results shown in Example 1 and the effects obtained on white milo starch pastes were quite comparable to the results shown in Example 2.

EXAMPLE 5

The following example illustrates several effects obtained by adding a polyborate to a pyrodextrin. A commercial grade of a sol-called "White Dextrine," made by dry heating corn starch (with HCl as a dextrinization catalyst) until the cold water soluble content was in the range of 85 to 90 percent, was employed. This commercial grade of dextrin is sold in large volumes to paper and paper board converters, and is used when cooked with about 1.25 to 1.75 parts of water, by weight, as an adhesive in the manufacture of laminated paper board, tubes, cartons, bags and envelopes. In some of these applications it is common practice to add 10 to 20 percent of borax, based on starch weight, to secure better tack, quicker setting or drying and other effects hereinabove set forth.

Eighty-five pounds of this dextrin was mixed with 127 pounds of water and the mixture was heated with stirring in a steam jacketed kettle to about 190 to 195° F. over a period of about 20 minutes. The adhesive was allowed to cool to room temperature. A second cook was made, identical to the first except that 15 pounds, anhydrous basis, of sodium decarborate was added prior to the heating stage. Water was added in both cooks to compensate for evaporation.

Comparative tack and setting time of the two adhesives were measured as follows. Films were cast on a grade of white bond paper employed in envelope manufacture, using a laboratory applicator set at 0.002 inch film thickness, at 25° C. This setting provided somewhat more adhesive than is commonly applied in industrial operations, but this larger amount was used in order to satisfy the absorptive capacity of the sheet and still leave a sufficient amount for surface film formation, so that film setting times were extended to values which could be more accurately measured. These film surfaces were tested for complete lack of surface tack every 15 seconds. It was found that whereas the film containing the decaborate required 6 minutes, 30 seconds to set to a tack-free surface, the control, containing no decaborate, required 9 minutes and 45 seconds.

Sections of the above described films were fastened to a glass top platform under one end of the beam of a large capacity, analytical balance. A metal disk weighing 5 grams, and of exactly one centimeter radius was suspended from this same end of the balance beam, by means of a wire hook and in a position such that when the beam of the balance was at rest, and horizontal, the metal disk just became disengaged from the wire hook and rested freely upon the surface of the glass top platform. After the adhesive films had been cast, and at setting times of 4 minutes, the metal disk was allowed to rest freely upon the adhesive film which had been placed on the glass top platform. After a contact time of 30 seconds, fine shot was poured slowly at a uniform rate into a pan suspended from the other end of the beam balance. The weight of shot required to just raise the metal disk free from the surface of the sticky adhesive was noted and this weight, in grams, was taken as the relative tack of the adhesive. The control adhesive with no decaborate had a relative tack of 18 grams; the adhesive containing the decaborate had a relative tack of 28 grams.

The pH value of the prepared adhesive containing the decaborate was 6.7 and accordingly there was almost no discoloration on cooking the dextrin with the decaborate. Indeed, films cast from this adhesive were of a surprisingly light color. It was also noted that these films were relatively clear, and as applied to the bond paper as above described, they remained relatively flat on drying in spite of the relatively large percentage of water used in test; in contrast, films cast on bond paper from the adhesive containing no decaborate, curled badly on drying.

The relative viscosities of the two adhesive cooks were determined by use of a Stormer viscometer for 100 revolutions and using a 50-gram actuating weight. The control adhesive had a viscosity of 66 seconds; the adhesive containing the decaborate, 128 seconds.

These results show that the addition of a polyborate to an adhesive prepared from a pyrodextrin increased the body of the adhesive, increased its tack and decreased its setting, or apparent drying time.

EXAMPLE 6

The following example shows that the addition of a polyborate to a dextrin "glue" significantly increases the adhesiveness of the "glue."

Example 5 was repeated to the stage where the prepared adhesives were aged overnight. The following day strips of white bond writing paper were coated with a film of each adhesive, using a laboratory applicator set at 0.001 inch. An uncoated strip of the same paper was impressed on the surface of the coated sheet and after a setting time of 3 minutes at room temperature, the strips, already cut to a width of 1 inch, were opened by hand at one end and these opened ends were fastened to the jaws of a device which exerted a sustained force automatically, just sufficient to pull the strips apart at a fixed rate. The force required was continuously recorded by a tracing pen on graph paper, and these values are given in gram-centimeters.

The average force required to separate the glued strips with the control adhesive, containing no polyborate, was 20 gram-centimeters; that required to separate the strips glued with the adhesive containing the polyborate was 50 gram-centimeters.

EXAMPLE 7

The procedures given in Example 5 were repeated, this time using only 80 pounds of the dextrin and 20 pounds, anhydrous basis, of added sodium decaborate. In this series of test cooks only 104 pounds of water was present, or a ratio of 1 to 1.3, dextrin to water. A second cook was made containing only 80 pounds of dextrin and 104 pounds of water. A third adhesive was also made in which 100 pounds of the dextrin was cooked in 104 pounds of water in order to show that the effects noted for the polyborate are not simply a solids concentration effect.

Testing procedures given in Example 5 were repeated and the results obtained on the three prepared adhesives are given in the table below:

| Adhesive Composition, lb. | | | Stormer Viscosity, 100 rev., 50 g. wt., Seconds | Drying Time, Min. | Tack, Grams |
|---|---|---|---|---|---|
| Dextrin | Water | Decaborate | | | |
| 80 | 104 | -------- | 101 | 5.75 | 20.0 |
| 80 | 104 | 20 | 223 | 4.75 | 26.6 |
| 100 | 104 | -------- | 166 | 5.25 | ------ |

From these results it will be seen that replacing the 20 pounds of decaborate with 20 more pounds of dextrin in the formulation did not increase the viscosity of the dextrin or the film drying rate to the levels obtained when decaborate was present.

Even at the concentration used in this example, the decaborate containing dextrin had a pH value of only 6.3.

EXAMPLE 8

The following example shows the effects of adding a polyborate to a dry, powdered pregelatinized starch.

A powdered, roll-dried corn starch product, marketed under the trade name Amijel, was made into a paste by stirring 15 grams with 120 ml. of cold (25° C.) water. Pastes of this nature are used in practice as heavy bodied adhesives, such as for example, as a wall paper paste, and in certain back-filling sizing applications.

Another paste was prepared by mixing 15 grams of the Amijel starch and 1.5 grams of sodium decaborate with 120 ml. of water.

Both pastes were stirred for about 3 minutes until smooth and then allowed to hydrate with occasional stirring for 30 minutes at room temperature.

The paste containing only the Amijel starch hydrated graually over the 30-minute holding period until it attained a body suitable for application. The paste containing the polyborate thickened very rapidly and within about 3 minutes became too thick to stir readily. It was necessary to add about 50 ml. more water to reduce its consistency so that it was equal to that of the paste containing no decaborate at 20-minutes hydration time.

Addition of the polyborate therefore not only increased the hydration rate of the Amigel but increased its water holding capacity from a ratio of about 1 to 8 parts of water up to about 1 to 13 parts of water.

EXAMPLE 9

Example 8 was repeated with similar results except that potassium decaborate octahydrate was used in place of the sodium decaborate.

EXAMPLE 10

The following example shows some unusual effects of a polyborate in modifying the paste properties of a starch phosphate.

A corn starch phosphate in the commercial fluidity range of 40, and having a degree of substitution (D.S.) of 0.03 as orthophosphate ester groups per anhydropyranose unit in the starch, was gelatinized by stirring a slurry of 28.35 grams of the starch phosphate in 280 ml. of water, in a boiling water bath for 15 minutes. The paste was cooled to room temperature and held for 24 hours. The paste was then stirred and its viscosity was measured in a Brookfield viscometer at several rotational speeds, using a No. 6 spindle, and at 28.5° C.; the paste pH value was 7.0. In the table below, Brookfield dial readings are given at rotational speeds from 3 r.p.m. to 300 r.p.m. and these values are expressed as poises in a second column.

A second paste was made at the same time from the same starch phosphate and in an identical manner except that 0.567 gram of sodium decaborate was also added. The paste pH was 7.9. Brookfield viscosities at 28.5° C. were determined for this paste and are recorded in the table below.

*Effect of sodium decaborate on the viscosity of a starch phosphate at different rates of shear*

| Rotational Speed of Spindle, r.p.m. | Viscosity of Starch Phosphate | | Viscosity of Starch Phosphate With 2% Added Decaborate | |
|---|---|---|---|---|
| | Brookfield Dial Reading, Percent | Poises, ×10$^{-2}$ | Brookfield Dial Reading, Percent | Poises, ×10$^{-2}$ |
| 3 | 6.9 | 230 | 7.7 | 256 |
| 6 | 9.0 | 150 | 10.4 | 173 |
| 15 | 12.6 | 84 | 15.9 | 106 |
| 30 | 16.6 | 55.3 | 24.0 | 80 |
| 60 | 22.6 | 37.7 | 33.8 | 56.3 |
| 120 | 32.0 | 26.7 | 49.6 | 41.3 |
| 300 | 49.6 | 16.5 | 87.3 | 29.1 |

It will be observed from the values given above, and from the plot of these values given in FIGURE 1, that at low rates of shear, the measured viscosities are very nearly the same for the two pastes. This seemed remarkable, inasmuch as the paste containing the sodium decaborate appeared to be very much more viscous on stirring by hand, or by pouring from one vessel to another. The paste containing the decaborate would be said to have more "body" and very much greater "length."

As the rate of shear was increased in the two instances, then the measured viscosity of the paste containing the decaborate became very much the larger value. Over the upper ranges of rate of shear used (60 to 300 r.p.m.) the viscosity of the paste containing the decaborate was at least 50 percent greater and finally at the highest rate of shear, was 75 percent greater than the paste containing no polyborate. This effect is highly important technically since adhesives and sizes in many applications are applied by equipment which produces high shearing stresses.

Stated in another manner, this example shows that as little as 2 percent of added decaborate reduced to a remarkable degree the apparent loss of starch paste body under the influence of increased shearing stress.

EXAMPLE 11

In the following example, the pH values of several common, starch paste modifying adjuncts of the prior art are compared against the pH value of a polyborate at several concentrations in water.

Solutions were made up of sodium decaborate, decahydrate in distilled water at concentrations noted below in the table and pH values were determined at 25° C. with a glass electrode, Beckman pH meter. For comparison pH values are given for solutions (or dispersions) of three prior art, start paste adjuncts, borax, sodium phosphate and sodium stannate at corresponding concentrations.

*Comparative pH values in water at 25° C.*

| Adjunct | Concentration, g/100 ml. H$_2$O | pH |
|---|---|---|
| Sodium Decaborate | 3.0 | 8.0 |
| | 5.0 | 7.7 |
| | 10.0 | 7.1 |
| | 15.0 | 6.8 |
| Borax [a] | 3.0 | 9.1 |
| | 5.0 | 9.2 |
| | 10.0 | 9.35 |
| | 15.0 | [b] 9.4 |
| Sodium Stannate | 3.0 | 11.2 |
| | 5.0 | 11.3 |
| | 10.0 | 11.4 |
| | 15.0 | 11.6 |
| Trisodium Phosphate | 3.0 | 11.5 |
| | 5.0 | 11.6 |
| | 10.0 | 11.6 |
| | 15.0 | 11.7 |

[a] Fisher's certified reagent grade sodium borate, $Na_2B_4O_7 \cdot 10H_2O$
[b] Supersaturated solution.

It will be seen that the polyborate not only has a pH value much more nearly neutral than borax and other paste modifying salts commonly used, but also, in contrast to other adjuncts the pH value of the polyborate solution becomes less the higher the concentration employed.

I claim:
1. A process for improving the properties of amylaceous paste suitable for adhesives, sizes and thickening agents, which comprises modifying the amylaceous material in the paste with about 0.5 to about 20 percent of a water-soluble decaborate salt.
2. A process for improving the colloidal characteristics of amylaceous materials which comprises reacting amylaceous materials in water with about 0.5 to about 20 percent of sodium decaborate at a temperature at least as high as the gelatinzation temperature of the amylaceous materials.
3. An amylaceous paste of improved colloidal properties suitable for adhesives, sizes and thickening agents consisting essentially of the reaction product of an amylaceous material in water with about 0.5 to about 20 percent sodium decaborate at a temperature at least as high as the gelatinization temperature of the amylaceous material.
4. An amylaceous paste of improved colloidal properties suitable for adhesives, sizes and thickening agents consisting essentially of the reaction product of an amylaceous material in water with about 0.5 to about 20% of a water-soluble decaborate.

References Cited in the file of this patent
UNITED STATES PATENTS

| 579,827 | Higgins | Mar. 30, 1897 |
| 2,144,610 | Bauer | Jan. 24, 1939 |